United States Patent [19]
Guerin

[11] Patent Number: 5,436,755
[45] Date of Patent: Jul. 25, 1995

[54] DUAL-BEAM SCANNING ELECTRO-OPTICAL DEVICE FROM SINGLE-BEAM LIGHT SOURCE

[75] Inventor: Jean-Michel Guerin, Glendale, Calif.

[73] Assignee: Xerox Corporation, Stamford, Conn.

[21] Appl. No.: 179,175

[22] Filed: Jan. 10, 1994

[51] Int. Cl.⁶ .......................... G02F 1/01; G02F 1/11; G02F 1/29; G02B 5/30

[52] U.S. Cl. .................... 359/249; 359/250; 359/256; 359/259; 359/494; 359/495

[58] Field of Search .............. 359/494, 495, 249, 250, 359/256, 259, 276, 286, 255, 257, 258, 281, 284, 301, 303, 304, 618, 629

[56] References Cited

U.S. PATENT DOCUMENTS 5,251,057 10/1993 Guerin ................................ 359/249
5,251,058 10/1993 MacArthur ........................ 359/249
5,258,869 11/1993 Nochebuena ...................... 359/278

Primary Examiner—Scott J. Sugarman
Assistant Examiner—Ricky Mack
Attorney, Agent, or Firm—Fariba Rad

[57] ABSTRACT

A raster output scanning system is disclosed which utilizes a single light source, an electro-optical device and a beam-splitter to generate two light beams in order to simultaneously scan two adjacent scan lines. Two different trains of pixel information are used to control the intensity of the laser light source and the degree of the polarization of the electro-optical device in order to modulate the two light beams with two separate trains of pixel information without using a modulating device. Each of the two light beams exiting the beam-splitter is modulated in accordance with one of the two trains of pixel information.

4 Claims, 5 Drawing Sheets

DUAL-BEAM SCANNING ELECTRO-OPTICAL DEVICE FROM SINGLE-BEAM LIGHT SOURCE

BACKGROUND OF THE INVENTION

This invention relates to a raster output scanning system and more particularly, to a raster scanning system which utilizes a single light source, an electro-optical device and a beam-splitter to generate and modulate two light beams with two different trains of information, without using a modulator, in order to scan two adjacent scan lines simultaneously.

BRIEF DESCRIPTION OF THE DRAWINGS

Other objects will become apparent from the following description with reference to the drawings wherein.

DESCRIPTION OF THE PREFERRED EMBODIMENT

Figure 1:
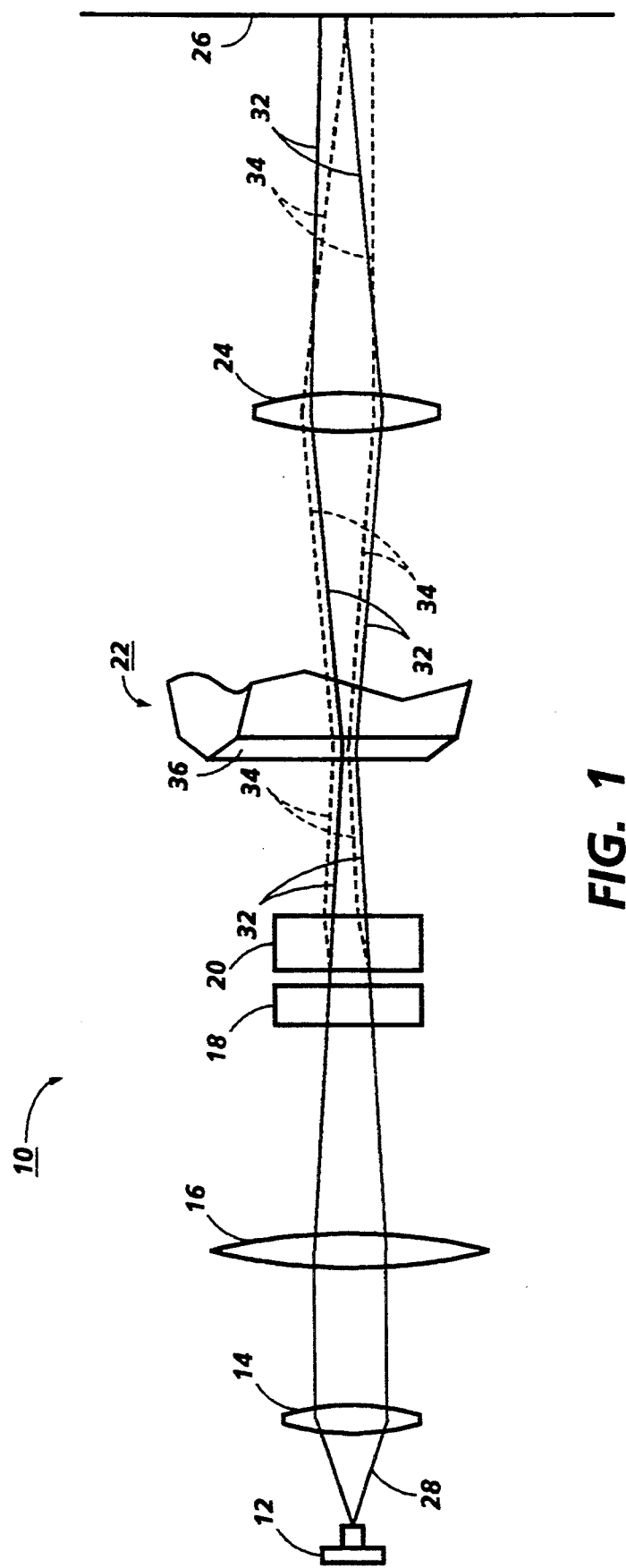
FIG. 1 shows a raster scanner of this invention.

Referring to FIG. 1, there is shown a raster scanner 10 of this invention. The raster scanner 10 contains a laser light source 12, a collimator 14, pre-polygon optics 16, an electro-optical device 18, a beam-splitter 20, rotating polygon mirror 22, post polygon optics 24 and a photosensitive medium 26. The laser light source 12 produces a light beam 28 and sends it to the electro-optical device 18 through the collimator 14 and the pre-polygon optics 16.

Figure 2:
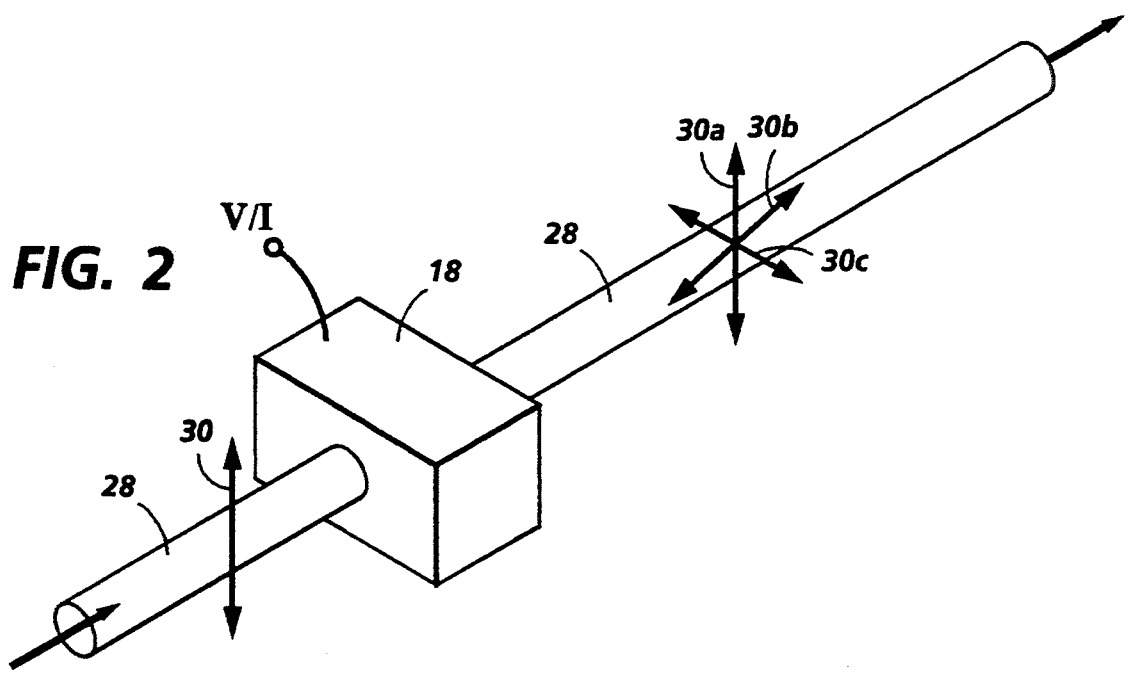
FIG. 2 shows an electro-optical device utilized in this invention for rotating the polarization of the light beam passing through the electro-optical device.
Figure 3:
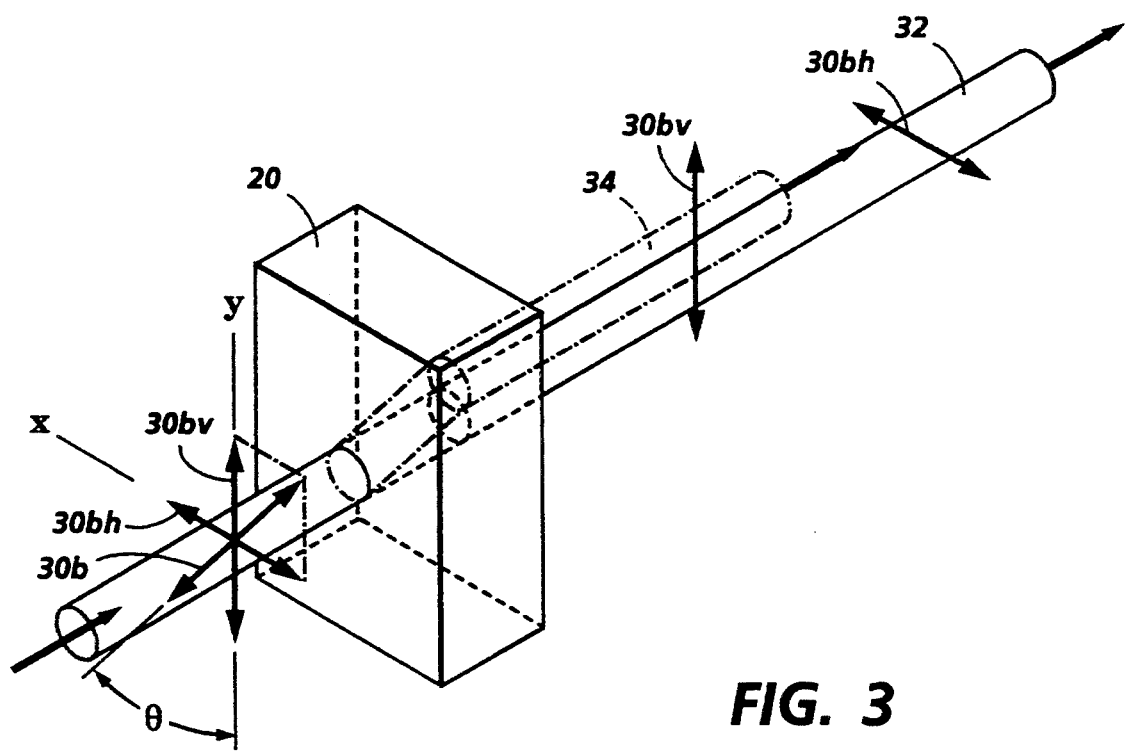
FIG. 3 shows a beam-splitter utilized in this invention to split the vertical and horizontal components of a polarized light beam.

For slow applications (milisecond-type), the electro-optical device 18 can be a liquid crystal cell and for faster applications (sub-microsecond) it can be an electro-optical Kerr-type cell or a magneto-optic cell. Referring to FIG. 2, upon applying a control voltage V or a control current I, the electro-optical device 18 rotates the polarization of the light beam passing through the electro-optical device 18. For example, the arrow 30 shows the polarization of the light beam before it enters the electro-optical device 18 and the arrows $30_a$, $30_b$ and $30_c$ show the polarization of the light beam after it exits the electro-optical device 18 based on three different control voltages. Depending on the control voltage, the light beam 28 exiting the electro-optical device 18 will have only one polarization Referring to FIG. 3, the light beam 28 from the electro-optical device 18 (FIG. 2) is sent to the beam-splitter 20. The beam-splitter 20 can be any type of birefringent crystal such as calcite, $TeO_2$, $LiNbO_3$, or a similar crystal. If the polarization $30_b$ of the light beam exiting the electro-optical device 18 (FIG. 2) has an angle with the Y axis of crystal, then the polarization can be imaged on two axes Y and X (X axis being perpendicular to Y axis). The polarized component $30_{bv}$ is along the Y axis of the crystal and the polarized component $30_{bh}$ is along the X axis of the crystal. In the above crystals, a polarized component along the X axis of the crystal will pass through the crystal without any changes. However, the Y component will be deflected in an angle inside the crystal and while exiting the crystal it will be deflected in such a manner that it exits parallel to the first component.

Referring back to FIG. 1, the two beams 32 and 34 will be sent to the rotating polygon mirror 22. The rotating polygon has a plurality of facets 36, each of which is a plane mirror. The facets 36 of the rotating polygon mirror 22 reflect the light beams 32 and 34 and also cause the reflected light beams 32 and 34 to revolve about an axis near the center of the reflection of the rotating polygon mirror 22 scanning two lines. These reflected light beams 32 and 34 can be utilized to scan a document at the input end of an imaging system as a raster input scanner or can be used to impinge upon a photographic film or a photosensitive medium 22, such as a xerographic drum at the output of the imaging system.

Figure 4:
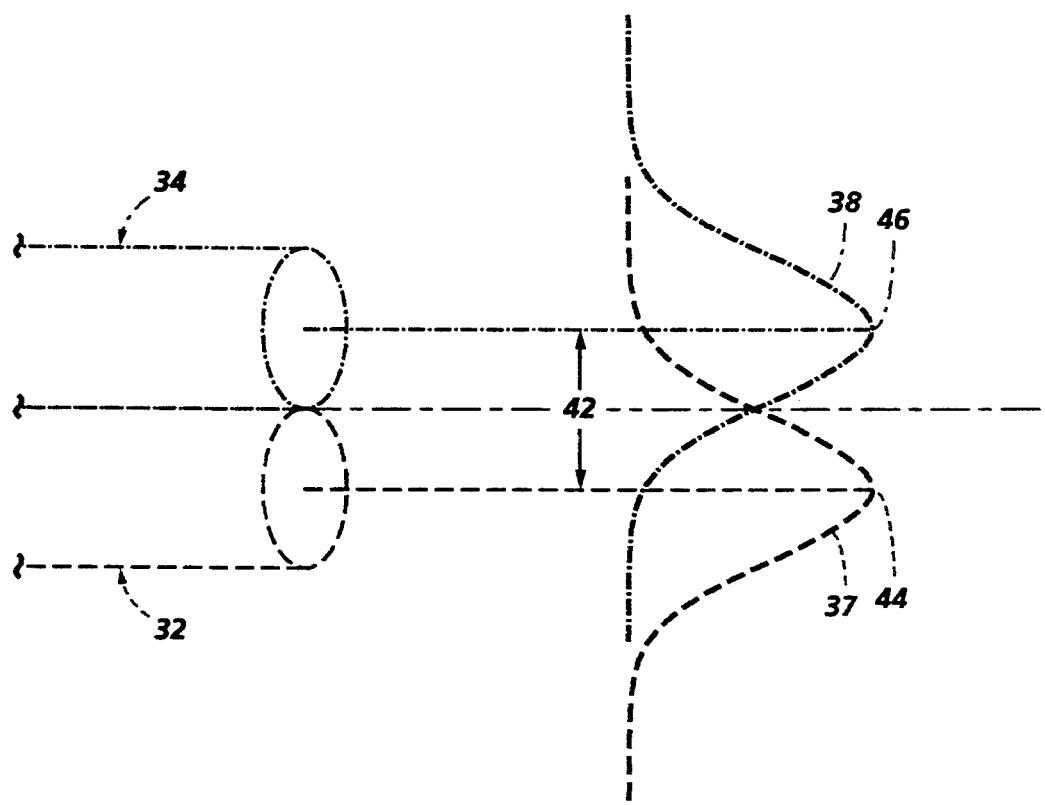
FIG. 4 shows Gaussian distributions of two light beams which partially overlap.

Referring to FIG. 4, there are shown the Gaussian distributions 37 and 38 of the two light beams 32 and 34. By adjusting the electro-optical device 18 (FIG. 1) to polarize the light beam at 45°, the two light beams exiting the beam-splitter 20 (FIG. 1) will have the same intensity. Also, depending on the thickness of the crystal used as the beam-splitter 20, the distance 42 between the peak 44 of the Gaussian distribution 37 and the peak 46 of the Gaussian distribution 38 can be changed. By selecting a proper crystal, the distance 42 between the two peaks can be kept equal to FWHM of a single light beam. Full width half max (hereinafter referred to as "FWHM") is the width of the Gaussian distribution at half of the maximum intensity.

By having two light beams with a distance between the two peaks equal to FWHM, two adjacent scan lines can be scanned. This enables dual-beam scanning with cross-polarized beams on adjacent scan lines. Double-beam scanning doubles the through put of the polygon or it can be used to slow down the polygon rotation by half compared to a single spot scanning. The disclosed embodiment of this invention provides a technique to scan two adjacent scan lines by utilizing a single laser light source. While scanning two scan lines, each light beam requires a different train of pixel information. Also, the disclosed embodiment of this invention is capable of modulating the two light beams by utilizing a single laser light source 14, the electro-optical device 18 and the beam-splitter 20.

However, for each pixel, depending on the combination of the pixels from each train of pixel information, the laser light source 12 has to provide a different power and the electro-optical device 18 has to provide a different polarization.

Since the light beam from the laser light source is being split into two beams, the intensity of the light beam from the laser light source has to be divided between the two light beams. The ratio between the two intensities depends on the amount of polarization. However, for scanning two adjacent light beams, the intensities of the two light beams should be kept the same.

In order to keep a fixed intensity for both light beams with any pixel combination, the power of the laser light source has to be adjusted based on the pixel combination for the two light beams. For example, if both light beams are On, the power of the laser light source has to be at its maximum (100%). In this case, each light beam receives half the intensity (50%) from the laser light source. However, depending on the pixel information, if one of the light beams is Off, then the power of the laser light source has to be decreased to 50%. The reason for decreasing the power is that if the power is kept at its maximum (100%), since only one light beam is On, that one light beam will receive the entire intensity (100%) from the laser light source which is double the intensity of each light beam when both light beams are On. On the other hand, if the power of the laser light source is decreased to 50%, the light beam which is On will receive all the intensity (50%) from the laser light source which is equal to the intensity of each light beam while both beams are On.

Therefore, there are three power levels for the laser light source; 100% for the time when both light beams are On, 50% for the time when only one light beam is On and 0% (Off) for the time when both light beams are Off. By observing the combination of the pixels from each train of pixel information, the power of the laser light source can be adjusted for each pixel.

In the same fashion, the degree of polarization has to be changed for each pixel. Depending on pixels, if two light beams are required, the electro-optical device has to be set to polarize the light beam at 45°. However, if only one light beam is needed, the polarization will be set at either 0° (horizontal) or at 90° (vertical) depending on if the light beam 32 (FIG. 3) or the light beam 34 (FIG. 3) is needed respectively.

Figure 5:
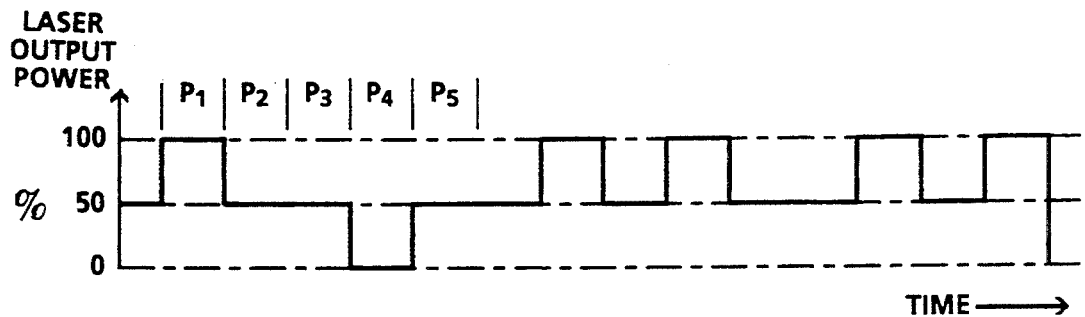
FIG. 5 shows the power requirements of the laser light source for different pixels.

For example, referring to FIGS. 5, 6, 7 and 8, there are shown the power requirements of the laser light source for different pixels, the polarization degree for each pixel, train of pixel information for beam 32 and the train of pixel information for beam 34 respectively. In FIGS. 5, 6, 7 and 8, the horizontal axes represent time. In FIG. 5, the vertical axis represents the output power of the laser light source, in FIG. 6, the vertical axis represents the polarization factor and in FIGS. 7 and 8 the vertical axes represent amplitude of the pixel information.

Figure 6:
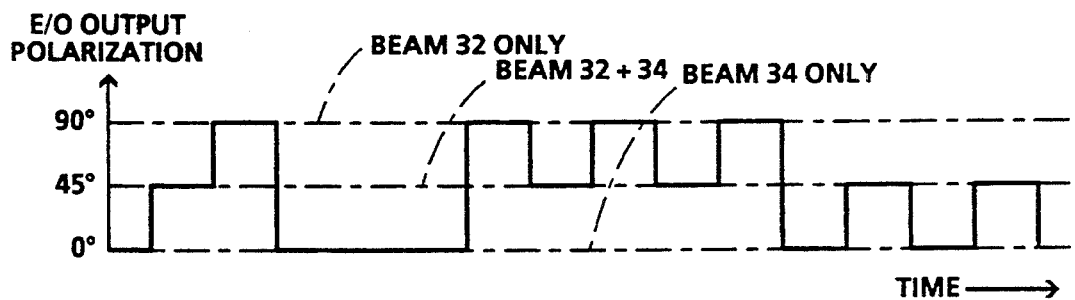
FIG. 6 shows the polarization degree of the electro-optical device for each pixel.
Figure 7:
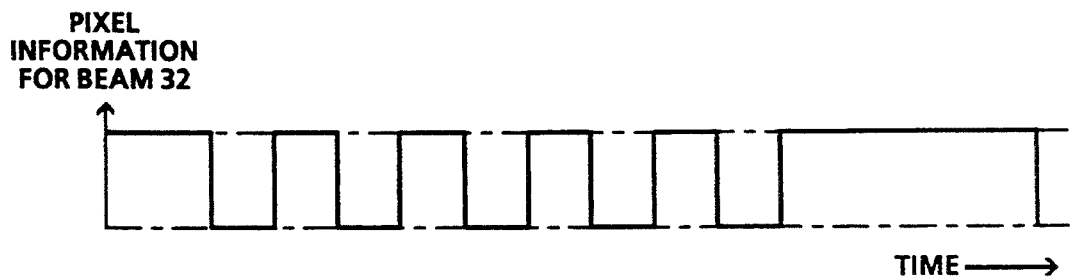
FIG. 7 shows a train of pixel information for the light beam generated from the horizontal component.
Figure 8:
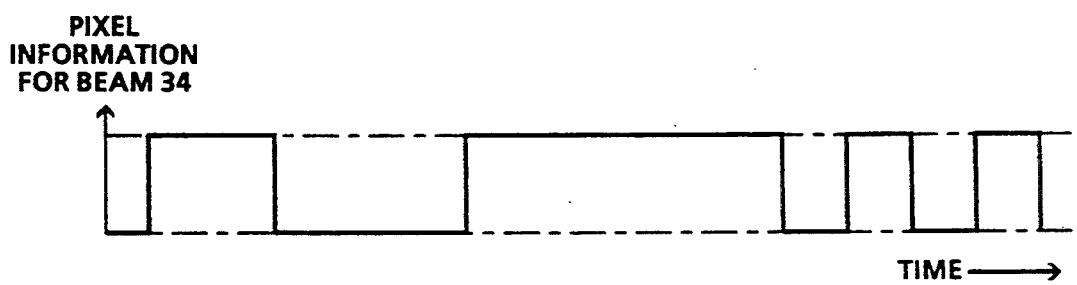
FIG. 8 shows a train of pixel information for the light beam generated from the vertical component.

Referring to FIGS. 5, 6, 7 and 8, as it can be observed, for pixel P1, the two light beams 32 and 34 are On. Therefore, for pixel P1, the power of the laser light source 12 (FIG. 5) has to be at its maximum (100%) and the electro-optical device 18 has to be set to polarize the beam at 45° (FIG. 6). For pixel P2, the light beam 32 is Off and the light beam 34 is On. For this combination, the power of the laser light source 12 has to be at 50% (FIG. 5) and the electro-optical device 18 has to be set to polarize the beam at 90° (FIG. 6). For pixel P3, the light beam 32 is On and the light beam 34 is Off. For this combination, the laser light source 12 has to be at 50% (FIG. 5) and the electro-optical device 18 has to be set to polarize the beam at 0° (FIG. 6). For pixel P4, the light beams 32 and 34 are Off. For this combination, the laser light source 12 has to be at 0% (FIG. 5) and the electrooptical device 18 can be set to polarize the beam at any polarization degree.

Table 1 summarizes the required output power of the laser light source and the required polarization degree of the electro-optical device based on different combinations of the pixels for the two light beams. Where both pixels from Video 1 and Video 2 are zero the laser light source should be turned Off and the polarization of electro-optical device does not make any difference. Where Video 1 is 0 and the Video 2 is 1, then the power of the laser light source should be at 50% and the polarization of electro-optical device should be at 0° (horizontal). Where Video 1 is 1 and Video 2 is 0, then the power of the laser light source should be at 50% and the polarization of electro-optical device should be at 90° (vertical). Finally, when both pixels Video 1 and Video 2 are 1, then the power of the laser light source should be at 100% and the polarization of electro-optical device should be at 45°.

TABLE 1

| Pixel info for light beam (Video 1) | Pixel info for light beam (Video 2) | Laser Output Power | Electo-optical Device Polarization | Voltage |
|---|---|---|---|---|
| 0 | 0 | 0 | any | any |
| 0 | 1 | 50% | 0° | 0 Volts |
| 1 | 0 | 50% | 90° | V Volts |
| 1 | 1 | 100% | 45° | V/2 Volts |

Figure 9:
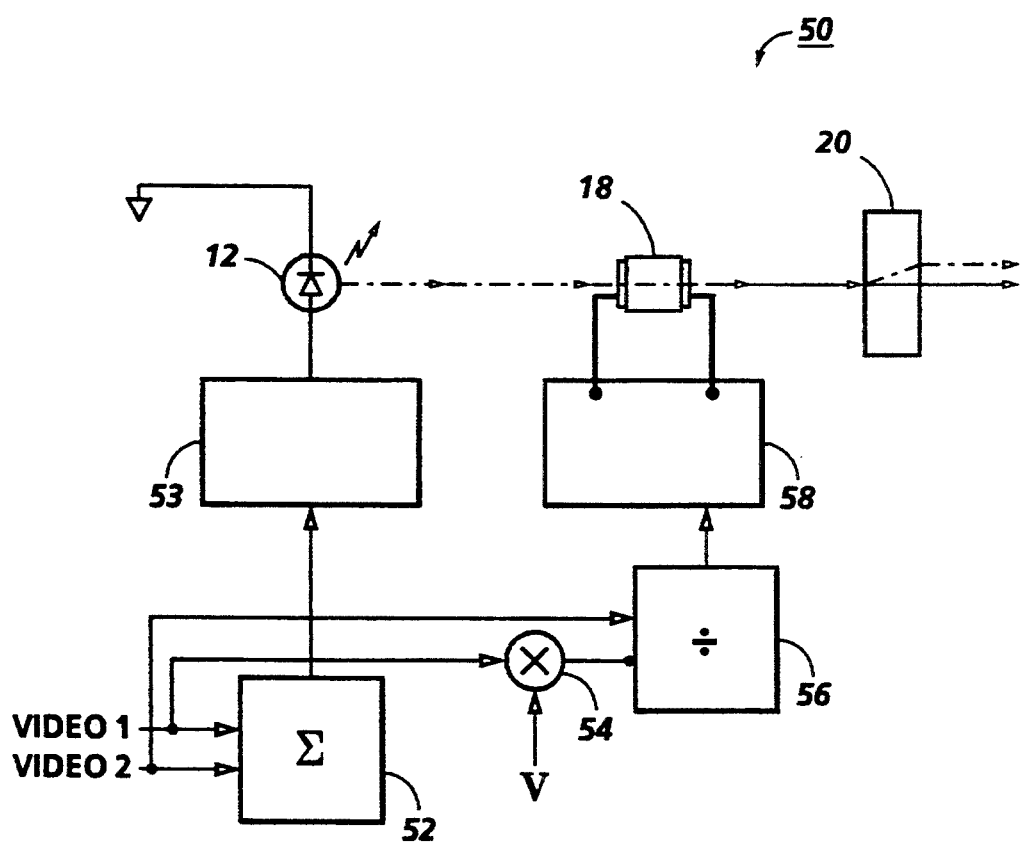
FIG. 9 shows a block diagram of a circuit which generates the proper inputs for the laser light source and the electro-optical device.

Referring to FIG. 9, there is shown a block diagram 50 of a circuit which generates the proper inputs to the laser light source 12 and the electro-optical device 18 in accordance with the combination of two trains of pixel information. Two trains of pixel information Video 1 and Video 2 are connected to adder 52 which is responsible to add the voltage of the two pixels. For simplicity, hereinafter, the train of pixel information Video 1 will be referred to as "Video 1" and the train of pixel information Video 2 will be referred to as "Video 2" As a control voltage, the sum of the two voltages is sent to driver 53 of the laser light source 12

A fixed voltage V and Video 1 are connected to a multiplier 54. The multiplier 54, multiplies the voltage V by the value (0 or 1) of the pixel received from Video 1 and sends the result to the divider 56. Divider 56 also receives Video 2 as a control signal. The output of the divider 56 is connected to the electro-optical driver 58 to control the polarization factor of the electro-optical device 18.

In operation, according to Table 1 and referring to FIG. 9, the voltages of the two pixels from Video 1 and Video 2 are added through the adder 52 and if both pixels are 0 then the sum of the voltages (the control voltage) will be 0 and therefore the laser light source will not emit any light beam. If both pixels from Video 1 and Video 2 are 1, then the sum of the voltages (the control voltage) will be double the voltage of a single pixel. In other words, the control voltage will be at its maximum which will cause the laser light source to emit a light beam with maximum intensity. However, if only one of the pixels from Video 1 and Video 2 is On, then the sum of the two voltages will be equal to the voltage of a single pixel and therefore the control voltage will be equal to half of the maximum voltage. This causes the laser light source to emit a light beam with half intensity.

Since the Multiplier 54 multiplies the voltage V by the value (0 or 1) of the pixel received from Video 1, the output of the multiplier will be either 0 or V depending on the value of the pixel. When the pixel from Video 1 is 0, then the output of the multiplier 54 will be 0 and when the pixel from Video 1 is 1, then the output of the multiplier 54 will be V. Video 2 is used as a control signal to set the divider 56 into mode 1 or mode 2. When the value of the pixel from Video 2 is 0, the divider will be set into mode 1 in which it divides the voltage (V or 0) received from the multiplier 54 by 1 and when the value of the pixel from Video 2 is 1, the divider will be set into mode 2 in which it divides the voltage (V or 0) received from the multiplier 54 by 2.

As a result, when Video 1 is 0, divider 56 receives 0 instead of V and sends out a zero to the electro-optical driver 58. Therefore, the electro-optical device will polarize the light beam at 0° (horizontal). When Video 1 is 1, then the divider 56 receives voltage V and depending on if Video 2 is 0 or 1, the divider 56 will divide the voltage V by 1 or 2 respectively and sends out a voltage V or V/2 respectively. Therefore, when Video 1 is 1 depending on if Video 2 is 0 or 1, the electro-optical device will polarize the light beam at 90° or 45° respectively.

What is claimed is:

1. A raster output scanner comprising:
   a laser light source for emitting a light beam;
   polarizing means located in the path of the light beam from said laser light source for receiving the light beam and polarizing the light beam at a first polarization degree, a second polarization degree or a third polarization degree;
   a medium;
   a beam-splitter located in the path of the polarized light beam from said polarizing means for receiving the polarized light beam and splitting the polarized light beam into two light beams for simultaneously scanning two scan lines on said medium;
   scanning means located in the path of the two light beams from said beam-splitter and being so constructed and arranged to scan said two light beams onto said medium;
   said beam-splitter and said polarizing means being so constructed and arranged that a polarized light beam will pass through said beam-splitter to one of said scan lines on said medium when said polarization means is at said first polarization degree, a polarized light beam will be split into two portions with one portion passing through said beam-splitter to said one scan line on said medium and the other portion of said polarized light beam being deflected to the other of said scan lines on said medium when said polarization means is at said second polarization degree, and a polarized light beam will be deflected to said other scan line on said medium when said polarization means is at said third polarization degree;
   means for providing two different trains of pixel information one for each of said scan lines;
   controlling means being electrically connected to said polarizing means and responsive to said two trains of pixel information for setting said polarizing means at either said first polarization degree, said second polarization degree or said third polarization degree in accordance with the two trains of pixel information, whereby the two light beams are modulated to scan said two scan lines.

2. The raster output scanner recited in claim 1, further comprising:
   selecting means being electrically connected to said laser light source and responsive to said two trains of pixel information for setting said laser light source at maximum intensity, at half intensity or at zero intensity in accordance with the two trains of pixel information.

3. The raster output scanner recited in claim 2, wherein said light source is at maximum intensity when said polarizing means is at said second polarization degree, and said light source is at half intensity when said polarizing means is at either said first polarization degree or said third polarization degree.

4. The raster output scanner recited in claim 1, wherein the first polarization degree is 0°, the second polarization degree is 45° and the third polarization degree is 90°.

* * * * *